(12) United States Patent
Davis et al.

(10) Patent No.: US 9,529,928 B2
(45) Date of Patent: Dec. 27, 2016

(54) INTELLIGENT CATEGORIZATION OF BOOKMARKS

(71) Applicant: International Business Machines Corporation, Armonk, NY (US)

(72) Inventors: Ryan A. Davis, Raleigh, NC (US); Asima Silva, Holden, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 167 days.

(21) Appl. No.: 13/785,570

(22) Filed: Mar. 5, 2013

(65) Prior Publication Data

US 2014/0258442 A1  Sep. 11, 2014

(51) Int. Cl.
*G06F 17/30* (2006.01)

(52) U.S. Cl.
CPC ..... *G06F 17/30884* (2013.01); *G06F 17/3089* (2013.01)

(58) Field of Classification Search
None
See application file for complete search history.

(56) References Cited

U.S. PATENT DOCUMENTS

| | | | |
|---|---|---|---|
| 6,275,862 B1 | 8/2001 | Sharma et al. | |
| 6,574,625 B1* | 6/2003 | Bates et al. | 707/749 |
| 7,031,961 B2 | 4/2006 | Pitkow et al. | |
| 2002/0184095 A1 | 12/2002 | Scullard et al. | |
| 2007/0033516 A1* | 2/2007 | Khosla et al. | 715/501.1 |
| 2007/0239734 A1 | 10/2007 | Arellanes et al. | |
| 2008/0168340 A1* | 7/2008 | Jang | 715/206 |
| 2008/0177858 A1 | 7/2008 | Aarnio et al. | |
| 2010/0082681 A1* | 4/2010 | Adimatyam et al. | 707/784 |
| 2011/0016411 A1* | 1/2011 | Boudalier | 715/760 |
| 2012/0131430 A1* | 5/2012 | Chen et al. | 715/206 |
| 2012/0158724 A1* | 6/2012 | Mahadevan | G06F 17/30873 707/737 |

* cited by examiner

*Primary Examiner* — Mohamed Ibrahim
(74) *Attorney, Agent, or Firm* — Patterson + Sheridan, LLP

(57) ABSTRACT

System, method, and computer program product, comprising, responsive to accessing a first electronic page in a browser, collecting metadata from the first electronic page, determining: (i) a set of existing data structures to store bookmarks for electronic pages in the browser, each data structure in the set of existing data structures representing an associated category for electronic pages, and (ii) a preference for using the existing data structures to store bookmarks for electronic pages, and, responsive to receiving an indication to bookmark the first electronic page, identifying, based on the metadata, the existing data structures, and the preference for using the existing data structures, a first data structure in which to store the bookmark for the first electronic page, presenting the first data structure for approval, and responsive to receiving approval for the first data structure, storing a bookmark for the first electronic page in the first data structure.

8 Claims, 3 Drawing Sheets

INTELLIGENT CATEGORIZATION OF BOOKMARKS

BACKGROUND

The present disclosure relates to computer software, and more specifically, to software for the intelligent categorization of bookmarks.

Modern users may create many bookmarks. However, the bookmarks may not get named properly, and confusion may occur later on as to what the bookmarks are for. Also, when other users access the bookmarks, they may not understand the previous user's organization structure. Furthermore, users may unknowingly create multiple bookmarks for the same site. Many users do not appreciate the administrative hassle of keeping all of their bookmarks organized until they have too many, and it becomes too burdensome to reorganize them.

SUMMARY

Embodiments disclosed herein provide a system, method, and computer program product for bookmarking network addresses, by, responsive to accessing a first electronic page in a browser, collecting metadata from the first electronic page, determining: (i) a set of existing data structures to store bookmarks for electronic pages in the browser, each data structure in the set of existing data structures representing an associated category for electronic pages, and (ii) a preference for using the existing data structures to store bookmarks for electronic pages, and, responsive to receiving an indication to bookmark the first electronic page, identifying, based on the metadata, the existing data structures, and the preference for using the existing data structures, a first data structure in which to store the bookmark for the first electronic page, presenting the first data structure for approval, and responsive to receiving approval for the first data structure, storing a bookmark for the first electronic page in the first data structure.

DETAILED DESCRIPTION

Figure 1:
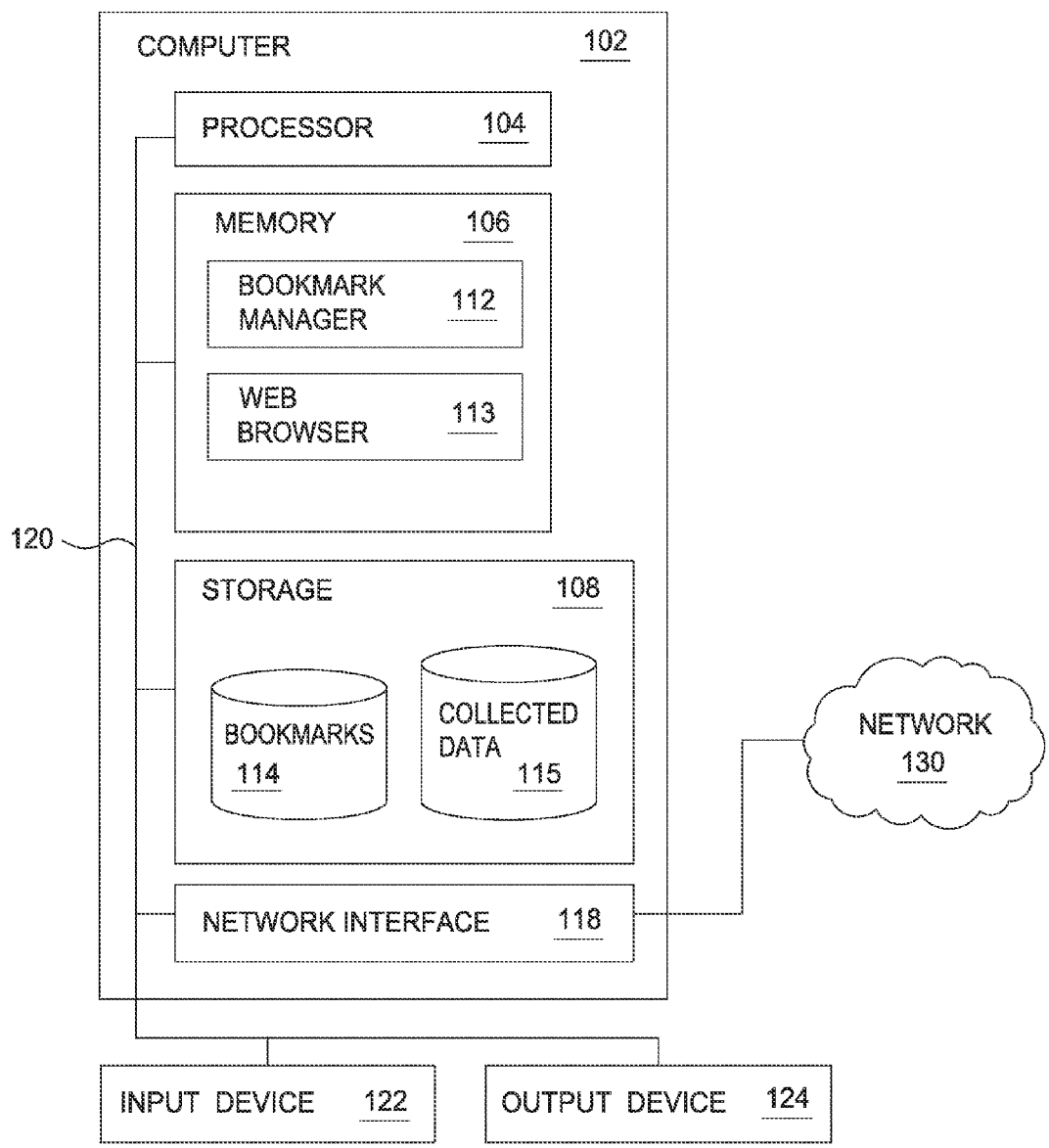
FIG. 1 is a block diagram illustrating a system for intelligent categorization of bookmarks, according to one embodiment disclosed herein.

Embodiments disclosed herein provide suggestions to categorize bookmarks in an intuitive, organized fashion. When a user visits an electronic page, such as a web site, and triggers an indication to bookmark the website, embodiments disclosed herein will automatically suggest a folder, or other data structure, within which the bookmark may be saved. The folder may be suggested based on different criteria, such as retrieved metadata of the web site, a set of existing folders in the web browser, and the user's preference for using the existing folders to store bookmarks. Additionally, embodiments disclosed herein may consider, in suggesting a folder, previous suggestions, and whether the user approved or rejected those suggestions. The metadata may indicate what type of web page the user is viewing, such as sports, weather, news, fashion, etc.

Each suggestion criterion is combined to produce a suggestion that represents the most logical and intuitive option for storing the bookmark for the web site. For example, a local news site may be bookmarked as a sports site, a news site, or a weather site, as the local news site may provide pages related to these general categories. Embodiments disclosed herein may then identify the bookmarks the user has currently saved, and determine that the user has saved a number of sports bookmarks. Embodiments disclosed herein may then retrieve metadata for the bookmarked pages, and determine that the bookmarked sites also serve multiple categories of pages, including general news pages, even though the user bookmarks these pages under the "sports" category. Embodiments disclosed herein may also determine what types of folders the user stores bookmarks for web pages having metadata indicating it is a sports web page, but is served by a provider who serves general news. Based on this combination of information, embodiments disclosed herein may suggest a relevant sports title for the bookmark, and suggests that the user store the bookmark in the folder that is most closely related to this type of web site, such as a "sports" folder. In addition, embodiments disclosed herein may also suggest a name for the bookmark along with the suggested folder.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access a bookmark manager or related data available in the cloud. For example, the bookmark manager could execute on a computing system in the cloud and intelligently suggest categories for user bookmarks. In such a case, the bookmark manager could receive user approval of bookmark categorization and store the bookmarks at a storage location in the cloud. Doing so allows a user to access this information from any computing system attached to a network connected to the cloud (e.g., the Internet).

FIG. 1 is a block diagram illustrating a system 100 for intelligent categorization of bookmarks, according to one embodiment disclosed herein. The networked system 100 includes a computer 102. The computer 102 may also be connected to other computers via a network 130. In general, the network 130 may be a telecommunications network and/or a wide area network (WAN). In a particular embodiment, the network 130 is the Internet.

The computer 102 generally includes a processor 104 connected via a bus 120 to a memory 106, a network interface device 118, a storage 108, an input device 122, and an output device 124. The computer 102 is generally under the control of an operating system (not shown). Examples of operating systems include the UNIX® operating system, versions of the Microsoft® Windows® operating system, and distributions of the Linux® operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 118 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, solid state drives, floppy disc drives, tape drives, removable memory cards or optical storage. The memory 106 and the storage 108 may be part of one virtual address space spanning multiple primary and secondary storage devices.

The input device 122 may be any device for providing input to the computer 102. For example, a keyboard and/or a mouse may be used. The output device 124 may be any device for providing output to a user of the computer 102. For example, the output device 124 may be any conventional display screen or set of speakers. Although shown separately from the input device 122, the output device 124 and input device 122 may be combined. For example, a display screen with an integrated touch-screen may be used.

As shown, the memory 106 contains the bookmark manager 112, which is an application generally configured to intelligently manage bookmarks in a web browser, such as the web browser 113. The web browser 113 may be any web browser capable of rendering pages and storing bookmarks. In one embodiment, the bookmark manager 112 is a plug-in for the web browser 113, which must be installed and enabled for use. In other embodiments, the bookmark manager 112 is a standalone application which manages bookmarks. As shown, storage 108 contains the bookmarks 114, which stores bookmarks for web pages. The storage 108 also contains collected data 115, which may be metatdata about specific webpages, such as a category and a content of the web page. The collected data 115 may also include browsing history for the web browser 113 and user data for a plurality of users. For example, the user data may include a number of accepted or rejected recommendations for storing bookmarks suggested by the bookmark manager 112. Although depicted as a database, the bookmarks 114 and collected data 115 may take any form sufficient to store data, including text files, xml data files, and the like.

Figure 2:
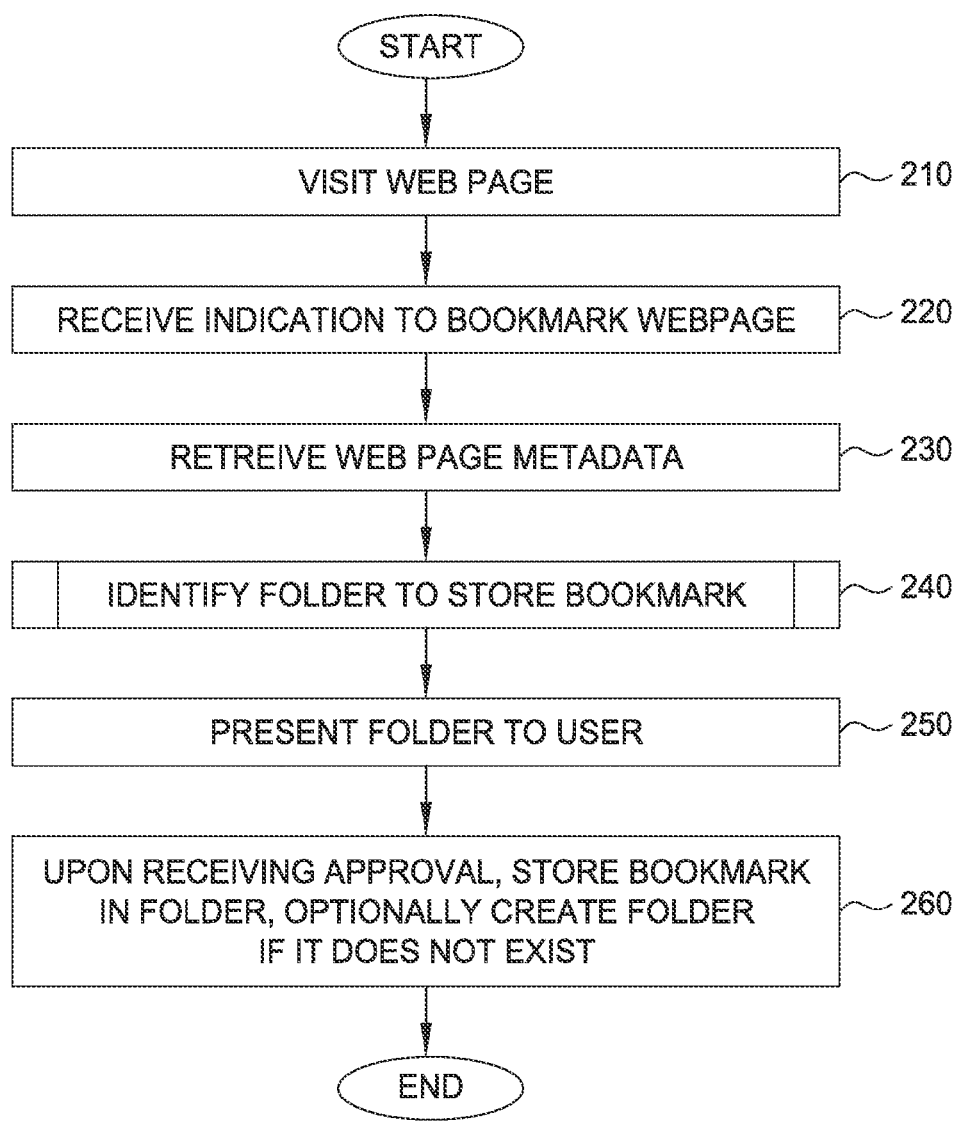
FIG. 2 is a flow chart illustrating a method for intelligent categorization of bookmarks, according to one embodiment disclosed herein.

FIG. 2 is a flow chart illustrating a method 200 for intelligent categorization of bookmarks, according to one embodiment disclosed herein. Generally, the method 200 uses a set of criteria to intelligently select a category, or folder, to store a bookmark for a web page visited by a user. At step 210, a user visits a web page, which may be rendered on his computer by the web browser 113. At step 220, an indication to bookmark the web page may be received by the bookmark manager 112. At step 230, the bookmark manager 112 may retrieve metadata about the web page. The bookmark manager 112 may retrieve the metadata by checking a source code of the website, which may include indications of the web page type, category, and other attributes of the web page. At step 240, described in greater detail with reference to FIG. 3, the bookmark manager 112 identifies a folder (or other data structure) to store the bookmark. Additionally, the bookmark manager 112 may also suggest, based on the metadata of the web page, a name for the bookmark. At step 250, the bookmark manager 112 may present the identified folder and name to the user. At step 260, the bookmark manager 112 may, upon receiving approval from the user, store the bookmark in the suggested folder, which may then be stored in the bookmarks 114. If the folder does not exist, the bookmark manager 112 may create the folder in the bookmarks 114. If the user does not approve the suggestion, a second suggestion may be presented to the user, according to the algorithm of step 240. Additionally, the bookmark manager 112 may receive user input indicating a different (i.e., user-specified) name and folder to store the bookmark under. Once the bookmark has been created, the metadata for the site may be deleted, or saved in the collected data 115 for further use.

Figure 3:
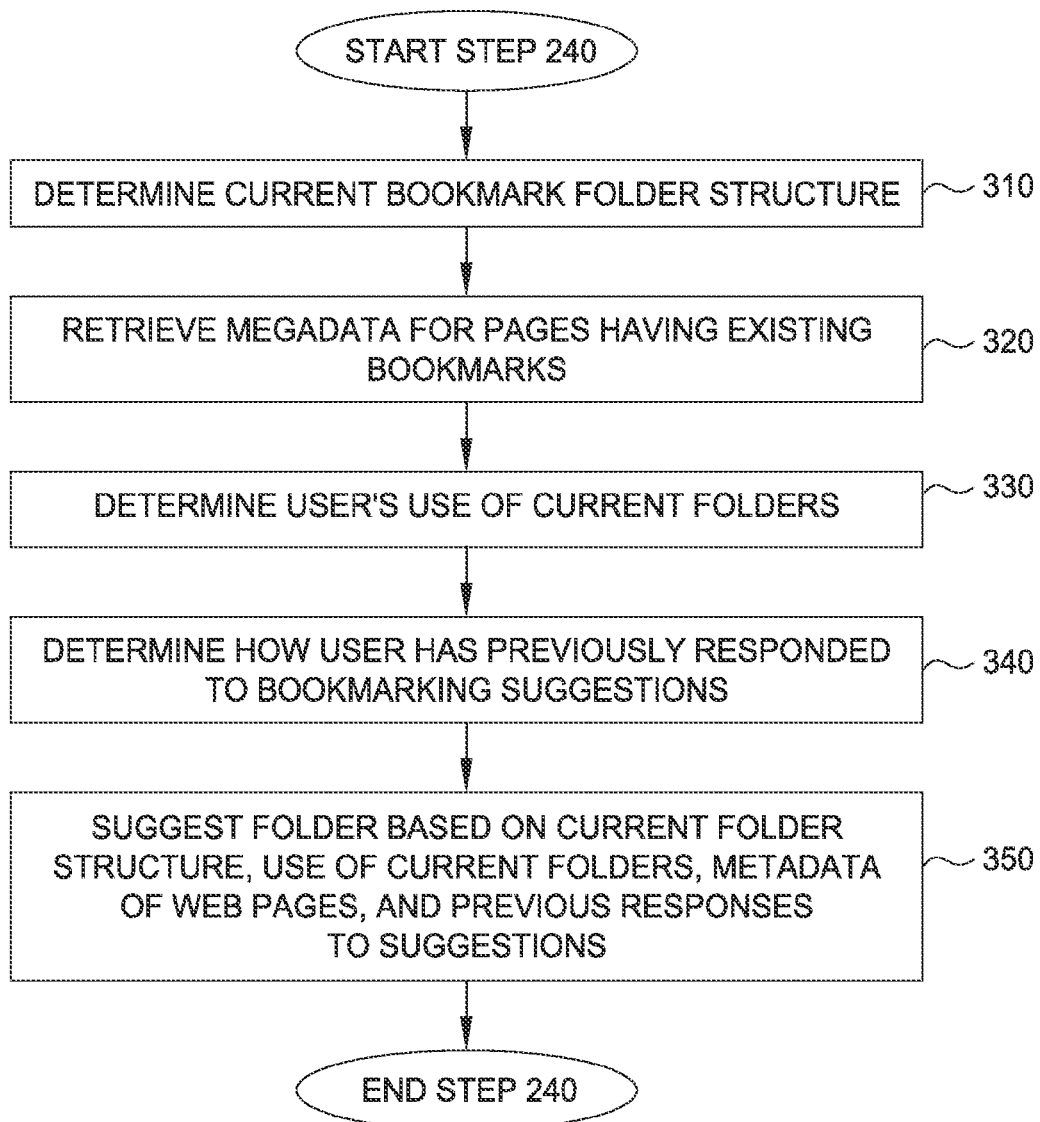
FIG. 3 is a flow chart illustrating a method for identifying a folder to store a bookmark, according to one embodiment disclosed herein.

FIG. 3 is a flow chart illustrating a method 300 for identifying a folder to store a bookmark, according to one embodiment disclosed herein. In one embodiment, the steps of the method 300 are performed by the bookmark manager 112. At step 310, the bookmark manager 112 determines a current folder structure of the bookmarks 114. This step may comprise determining a number of folders in the bookmarks, their names, associated categories (if different from their names), and the contents of each folder. For example, the bookmark manager 112 may identify folders for "news," "sports," and "videos." The bookmark manager 112 may then also identify each bookmark within these folders. The bookmark folder structure for one or multiple users may be determined at step 310. At step 320, the bookmark manager 112 may retrieve metadata for the pages having existing bookmarks in the bookmarks 114. This step may comprise the bookmark manager 112 retrieving metadata (or the source code) of each web page in the bookmarks 114. In another embodiment, the metadata for the web pages may be cached and saved in the collected data 115.

At step 330, the bookmark manager 112 may determine the user's preference for using the current folders to store bookmarks. This step may include determining a user's habits in bookmarking, such as where a user prefers to store bookmarks for pages that may belong to multiple categories, their general bookmarking habits, and the like. In one embodiment, the usage of the current folders by other users may be determined by the bookmark manager 112 at step 330. At step 340, the bookmark manager 112 determines how the user has previously responded to bookmarking suggestions presented by the bookmark manager 112. When a bookmark suggestion is presented to the user, the bookmark manager 112 may store, in the collected data 115, an indication as to whether the user accepted or rejected the suggestion. A ratio of the number of acceptances to the number of rejections may be used to weight the ultimate determination as to what folder to suggest to the user. If the number of accepted suggestions outweighs the number of rejections, the bookmark manager 112 may be more confident in its ability to make suggestions to the user, which may add support to its decision to suggest a particular category. If the number of rejections outweighs the number of acceptances, the bookmark manager 112 may select a different category to present to the user. At step 350, the bookmark manager 112 may suggest a folder based on a combination of the current folder structure, the user's preference for using the current folders to store bookmarks, the metadata of the web pages, and the user's response to previous category suggestions. The folder may be suggested by weighting each criterion, computing a score for each criterion, and then computing a composite score for each category. The weights for each criterion may be adjusted to place more emphasis on a particular criterion, or they may be weighted equally. For example, the web page metadata, the current folder structure, and the user's preference for using the current folders may each have a weight of 0.30, while the user's responses to previous category suggestions may be weighted 0.1.

As an example, suppose a user visits a web page, such as www.ibm.com. The bookmark manager 112 may not be invoked until the user triggers an indication to create a bookmark for www.ibm.com. At this point, the bookmark manager 112 may process the source code for the webpage at www.ibm.com, and determine that it may belong to a number of different categories, such as "products," "services," and "computing." The bookmark manager 112 may then determine a current bookmark folder structure in the bookmarks 114, and determine that the user has "computing" and "services" folders. The bookmark manager 112 may then process existing bookmarks saved by the user in the bookmarks 114. In one embodiment, the bookmarks processed by the bookmark manager 112 are limited to those bookmarks stored in the "computing" and "services" folders. In another embodiment, all existing bookmarks may be processed by the bookmark manager 112. At this point, the bookmark manager 112 may determine that the user has a heavy preference for the "services" folder, as the majority of the bookmarks are saved in this folder, even though their metadata indicates that they may be members of both categories. Additionally, the bookmark manager 112 may monitor the user's behavior on the web site to determine whether the content the user is interacting with is more closely related to "computing" or "services." Even further still, if the user found the web site by conducting a web search, the search string inputted by the user may be parsed to determine whether it is more closely aligned with "computing" or "services." The bookmark manager 112 may then optionally reference the suggestion history for this user, and determine whether the user tends to accept or reject suggestions made by the bookmark manager 112.

At this point, the bookmark manager 112 may identify the "services" folder as the most appropriate folder within which to store the bookmark for www.ibm.com. The bookmark manager 112 may identify the "services" folder by computing a score for the "services" and "computing" folders. A similarity between the metadata and the folder titles may increase the score for each folder. The user's preference for using the "services" folder to store a majority of the bookmarks may increase the score for the "services" folder, and reduce the score for the "computing" folder. The bookmark manager 112 may combine the scores for each criterion, and weight them accordingly to compute an overall score for each folder. The bookmark manager 112 may then select the folder having the highest score. In another embodiment, the bookmark manager 112 may present the user with both choices, namely the "services" folder and the "computing" folder, regardless of score. The user may then select one of the presented folders to store the bookmark.

Once the "services" folder is identified, the bookmark manager 112 may present the user with a suggestion that the bookmark be placed in the "services" folder, and may also provide a title for the bookmark, which may read "IBM.com." If the user accepts the suggestion, the bookmark will be created and saved in the "services" folder. If the user wishes to alter the title or folder, the bookmark manager 112 may receive these changes and save the bookmark accordingly. Additionally, the user may be presented the option to have his or her bookmarks and folders submitted to a centralized database. In such an embodiment, the bookmark manager 112 may have more data gathered, leading to the generation of more accurate suggestions.

If no bookmarks existed in the user's folder structure, the bookmark manager 112 may present one, two, or all three of the proposed folders to the user for selection. Once the user selects a folder, that folder may be created in the bookmarks 114, and the bookmark may be stored in the folder.

Advantageously, embodiments disclosed herein address the common problems of bookmark redundancy, lack of structure, lack of organization, and ambiguous bookmark titles. Embodiments disclosed herein intelligently suggest names and folders for bookmarks of a web page based on the web page metadata, the existing folder structure, the user's preference for using the current folder structure, and a rate of success in making previous suggestions to users.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A system, comprising:
   one or more computer processors; and
   a memory containing a program, which, when executed by the one or more computer processors, performs an operation for bookmarking network addresses, the operation comprising:
   responsive to accessing a first page in a browser, collecting metadata from the first page, wherein the metadata identifies a plurality of subject matter categories associated with the first page;
   determining: (i) a set of data structures to store bookmarks for pages in the browser, wherein each data structure in the set of data structures identifies an associated category for one or more page bookmarks stored in that data structure and (ii) a preference for using the data structures to store bookmarks for pages, wherein each data structure references any previously bookmarked pages stored in the data structure, each previously bookmarked page having metadata identifying one or more subject matter categories associated with the previously bookmarked page; and
   responsive to receiving an indication to create a bookmark referencing the first page:
   identifying, based on the metadata, the data structures, and the preference for using the data structures, a first one of the data structures in which to store the bookmark for the first page, wherein the identification is further based on a ratio of a count of approvals to a count of rejections in previous presentations of the first data structure for approval and wherein the identification is further based on a count of data structures previously presented and approved;
   presenting the first data structure for approval by presenting a name for the first data structure, wherein the name for the first data structure is based upon the collected metadata and is generated upon determining that the first data structure does not exist in the browser; and responsive to receiving approval for the first data structure:

storing a bookmark for the first page in the first data structure.

2. The system of claim 1, wherein determining the use of the data structures comprises:
identifying a respective category for each page bookmarked in the set of data structures; and
determining whether the respective category of each bookmarked page matches the associated category for the data structure within which the bookmark of the respective page is stored.

3. The system of claim 2, wherein the bookmark for the first page is stored in a second data structure upon determining that more bookmarks for pages sharing the same category as the first page are stored in the second data structure than the first data structure.

4. The system of claim 1, the operation further comprising:
creating the first data structure upon determining that the first data structure does not exist in the browser.

5. A computer program product for bookmarking network addresses, comprising:
a non-transitory computer-readable storage medium having computer-readable program code embodied therewith, the computer-readable program code comprising:
computer-readable program code configured to, responsive to accessing a first page in a browser, collect metadata from the first page;
computer-readable program code configured to determine: (i) a set of data structures to store bookmarks for pages in the browser, wherein each data structure in the set of data structures identifies an associated category for one or more page bookmarks stored in that data structure and (ii) a preference for using the data structures to store bookmarks for pages, wherein each data structure references any previously bookmarked pages stored in the data structure, each previously bookmarked page having metadata identifying one or more subject matter categories associated with the previously bookmarked page; and
computer-readable program code configured to, responsive to receiving an indication to create a bookmark referencing the first page:
identify, based on the metadata, the data structures, and the preference for using the data structures, a first data structure in which to store the bookmark for the first page, wherein the identification is further based on a ratio of a count of approvals to a count of rejections in previous presentations of the first data structure for approval and wherein the identification is further based on a count of data structures previously presented and approved;
present the first data structure for approval by presenting a name for the first data structure, wherein the name for the first data structure is based upon the collected metadata and is generated upon determining that the first data structure does not exist in the browser; and
responsive to receiving approval for the first data structure:
store a bookmark for the first page in the first data structure.

6. The computer program product of claim 5, wherein determining the use of the data structures comprises:
identifying a respective category for each page bookmarked in the set of data structures; and
determining whether the respective category of each bookmarked page matches the associated category for the data structure within which the bookmark of the respective page is stored.

7. The computer program product of claim 6, wherein the bookmark for the first page is stored in a second data structure upon determining that more bookmarks for pages sharing the same category as the first page are stored in the second data structure than the first data structure.

8. The computer program product of claim 5, the computer readable program code further comprising:
computer-readable program code configured to create the first data structure upon determining that the first data structure does not exist in the browser.

* * * * *